(12) United States Patent
Danko et al.

(10) Patent No.: US 12,111,006 B2
(45) Date of Patent: Oct. 8, 2024

(54) MOTORIZED APPARATUS FOR PIPE INSPECTION AND REPAIR

(71) Applicant: General Electric Company, Schenectady, NY (US)

(72) Inventors: Todd William Danko, Niskayuna, NY (US); Alexander Kyle Duncan, Niskayuna, NY (US); Marshall G. Jones, Scotia, NY (US); Guanghua Wang, Clifton Park, NY (US); Venkata Vijayaraghava Nalladega, Watervliet, NY (US); Viktor Holovashchenko, Clifton Park, NY (US); John M. Lizzi, Gansevoort, NY (US); Arpit Jain, Hayword, CA (US)

(73) Assignee: General Electric Company, Schenectady, NY (US)

( * ) Notice: Subject to any disclaimer, the term of this patent is extended or adjusted under 35 U.S.C. 154(b) by 342 days.

(21) Appl. No.: 17/577,894

(22) Filed: Jan. 18, 2022

(65) Prior Publication Data
US 2023/0228360 A1 Jul. 20, 2023

(51) Int. Cl.
*F16L 55/30* (2006.01)
*B23K 26/08* (2014.01)
(Continued)

(52) U.S. Cl.
CPC .............. *F16L 55/30* (2013.01); *F16L 55/18* (2013.01); *B23K 26/0869* (2013.01);
(Continued)

(58) Field of Classification Search
CPC . F16L 55/30; F16L 55/18; F16L 55/32; F16L 2101/10; F16L 2101/30;
(Continued)

(56) References Cited

U.S. PATENT DOCUMENTS 3,238,448 A * 3/1966 Wood ................... G01N 27/902
324/219
4,218,923 A * 8/1980 Triplett ................... E21B 47/00
73/623
(Continued)

FOREIGN PATENT DOCUMENTS

CA 1292306 C * 11/1991
CN 111022821 A 4/2020
(Continued)

OTHER PUBLICATIONS

Translation JP-11160295-A (Year: 1999).*
(Continued)

*Primary Examiner* — Octavia Hollington
*Assistant Examiner* — Monica S Young
(74) *Attorney, Agent, or Firm* — Armstrong Teasdale LLP (57) ABSTRACT

Methods, systems, and apparatus are described for maintaining the interior cavities of pipes. In one aspect, a motorized apparatus includes a main body having a length extending along a longitudinal axis of the main body, where the main body comprises a first end and a second end opposite the first end. The motorized apparatus further includes at least one drive assembly coupled to at least one of the first end and the second end of the main body, where the at least one drive assembly comprises driven members that engage with an inner surface of the pipe and move the motorized apparatus through an interior cavity of the pipe. The motorized apparatus further includes a maintenance head movably coupled to the main body that moves along the length of the main body and rotates about the longitudinal axis of the main body, where the maintenance head comprises at least one tool configured to perform an action on the inner surface of the pipe.

20 Claims, 7 Drawing Sheets

(51) Int. Cl.
  *B23K 26/14* (2014.01)
  *B23K 26/16* (2006.01)
  *B23K 26/34* (2014.01)
  *B23K 26/362* (2014.01)
  *B23K 37/02* (2006.01)
  *B23K 101/10* (2006.01)
  *F16L 55/18* (2006.01)
  *F16L 101/30* (2006.01)

(52) U.S. Cl.
  CPC .............. *B23K 26/14* (2013.01); *B23K 26/16* (2013.01); *B23K 26/34* (2013.01); *B23K 26/362* (2013.01); *B23K 37/0282* (2013.01); *B23K 37/0294* (2013.01); *B23K 2101/10* (2018.08); *F16L 2101/30* (2013.01)

(58) Field of Classification Search
  CPC ............ B23K 2101/06; B23K 2101/10; B23K 26/0869; B23K 26/14; B23K 26/16; B23K 26/34; B23K 26/362; B23K 37/0282; B23K 37/0294
  USPC ........................................................ 73/865
  See application file for complete search history.

(56) References Cited

U.S. PATENT DOCUMENTS

| | | | |
|---|---|---|---|
| 4,785,512 A | 11/1988 | Sigel | |
| 5,430,270 A | 7/1995 | Findlan et al. | |
| 5,565,633 A * | 10/1996 | Wernicke | G01N 27/82 73/865.8 |
| 7,077,020 B2 | 7/2006 | Langley et al. | |
| 7,812,328 B2 * | 10/2010 | Betz | B01J 19/128 250/493.1 |
| 8,800,396 B2 | 8/2014 | Langley et al. | |
| 10,072,800 B1 * | 9/2018 | Logan | E03F 7/00 |
| 10,794,690 B2 | 10/2020 | Dobell et al. | |
| 2002/0153161 A1 * | 10/2002 | Mazzer | F16L 58/1063 174/121 A |
| 2003/0039752 A1 * | 2/2003 | Winiewicz | B05B 13/0636 427/427.2 |
| 2007/0022830 A1 * | 2/2007 | Mandziuk | G01N 27/902 73/865.8 |
| 2008/0245258 A1 * | 10/2008 | Herron | F16L 55/32 104/138.2 |
| 2014/0147600 A1 * | 5/2014 | Neukirchen | B23K 35/0244 427/535 |
| 2020/0278068 A1 * | 9/2020 | Boulet D'Auria | F16L 55/1686 |
| 2020/0393416 A1 * | 12/2020 | Prieur | G01N 29/343 |
| 2021/0025852 A1 * | 1/2021 | Howland | G06F 30/13 |

FOREIGN PATENT DOCUMENTS

| | | | |
|---|---|---|---|
| CN | 116297821 B | * | 9/2023 |
| JP | H0257974 A | * | 2/1990 |
| JP | 11160295 A | * | 6/1999 |
| KR | 20080109378 A | * | 12/2008 |
| KR | 101494784 B1 | * | 2/2015 |
| KR | 101649319 B1 | * | 8/2016 |

OTHER PUBLICATIONS

"Robotic Crawler for Internal Repair of Pipelines", Robotic Research, Feb. 28, 2020.

Abi Millar, "How Robotics are Ushering in a New Era of Pipeline Repair Technology", NS Energy, Aug. 28, 2020.

* cited by examiner

MOTORIZED APPARATUS FOR PIPE INSPECTION AND REPAIR

BACKGROUND

The field of the disclosure relates to maintenance of pipes, and more particularly, to motorized apparatus that travel through an interior cavity of the pipes and perform inspection and/or maintenance operations within the pipes.

Pipes are commonly used to transport fluids. For example, typical pipes include a cylindrical sidewall that defines an interior cavity. During operation, fluids are transported within the interior cavity of the pipes. Sometimes, the fluids that are transported through the pipes have characteristics that can cause wear, deterioration, or otherwise affect the properties of the pipes. As a result, the pipes may require routine inspection and/or repair. However, the interior cavity of the pipes may be difficult to access for routine maintenance. For example, some pipes may be used to transport fluids having high temperatures, pressures, and/or other properties that create conditions which are inhospitable for equipment and/or personnel. Further, some pipes may be sized such that access by personnel is difficult or impossible.

Accordingly, it is desirable to improve on how pipes are internally inspected and/or repaired, especially for pipes that are used to transport hazardous materials and/or are sized such that access by workers is difficult and/or impossible.

BRIEF DESCRIPTION

In one aspect, a system for use in maintaining a pipe having a sidewall defining an interior cavity and having an inner surface is provided. The system includes a motorized apparatus and at least one controller communicatively coupled to the motorized apparatus. The motorized apparatus is sized to fit within the interior cavity of the pipe. The motorized apparatus comprises a main body having a length extending along a longitudinal axis of the main body, where the main body includes a first end and a second end opposite the first end. The motorized apparatus includes at least one drive assembly coupled to at least one of the first end and the second end of the main body, where the at least one drive assembly includes driven members that engage with the inner surface of the pipe and move the motorized apparatus through the interior cavity of the pipe. The motorized apparatus further includes a maintenance head that is movably coupled to the main body and moves along the length of the main body and rotates about the longitudinal axis of the main body. The maintenance head comprises at least one tool that performs an action on the inner surface of the pipe. The controller moves the motorized apparatus through the pipe utilizing the plurality of drive assemblies until a work location on the inner surface of the pipe is positioned between the first end and the second end of the main body. The controller moves the maintenance head along the length of the main body and rotates the maintenance head about the longitudinal axis of the main body until the at least one tool is proximate to the work location, and performs the action at the work location using the at least one tool.

In another aspect, a method for maintaining a pipe having a sidewall defining an interior cavity and having an inner surface is provided. The method includes positioning a motorized apparatus within the interior cavity of the pipe, where the motorized apparatus includes a main body having a length extending along a longitudinal axis of the main body and a first end and a second end opposite the first end. The motorized apparatus further includes at least one drive assembly coupled to at least one of the first end and the second end of the main body, where the at least one drive assembly including driven members that engage with the inner surface of the pipe. The method further includes moving the motorized apparatus through the interior cavity of the pipe using the at least one drive assembly until a work location on the inner surface of the pipe is located between the first end and the second end of the main body. The method further includes moving a maintenance head coupled to the main body along the length of the main body and rotating the maintenance head about the longitudinal axis of the main body until at least one tool on the maintenance head is proximate to the work location, and performing an action at the work location using the at least one tool.

In another aspect, a motorized apparatus for maintaining a pipe having a sidewall defining an interior cavity and an inner surface is provided. The motorized apparatus includes a main body having a length extending along a longitudinal axis of the main body, where the main body comprises a first end and a second end opposite the first end. The motorized apparatus further includes at least one drive assembly coupled to at least one of the first end and the second end of the main body, where the at least one drive assembly comprises driven members configured to engage with the inner surface of the pipe and move the motorized apparatus through the interior cavity of the pipe. The motorized apparatus further includes a maintenance head movably coupled to the main body that moves along the length of the main body and rotates about the longitudinal axis of the main body, where the maintenance head comprises at least one tool configured to perform an action on the inner surface of the pipe.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), an application specific integrated circuit (ASIC), and other programmable circuits, and these terms are used interchangeably herein. In the embodiments described herein, "memory" may include, but is not limited to, a computer-readable medium, such as a random-access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a programmable logic controller (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Embodiments described herein relate to inspecting and/or repairing the interior of pipes using a motorized apparatus. The motorized apparatus includes one or more tools on a maintenance head, which are transported by the motorized apparatus to a work location within the pipes. In embodiments described herein, the maintenance head on the motorized apparatus is movably affixed to a main body of the motorized apparatus, which facilitates the repositioning of the tool(s) along a length of the main body and/or the rotation of the tool(s) around a longitudinal axis of the main body, thereby facilitating the motorized apparatus to perform work at the work location without repositioning the motorized apparatus. The movable maintenance head facilitates correct positioning of the tool for a maintenance operation even if there is an inexact placement of the motorized apparatus relative to the work location within the pipes, thereby providing a technical benefit of improving the efficiency and speed at which inspections and/or repairs on the pipe are performed.

Figure 1:
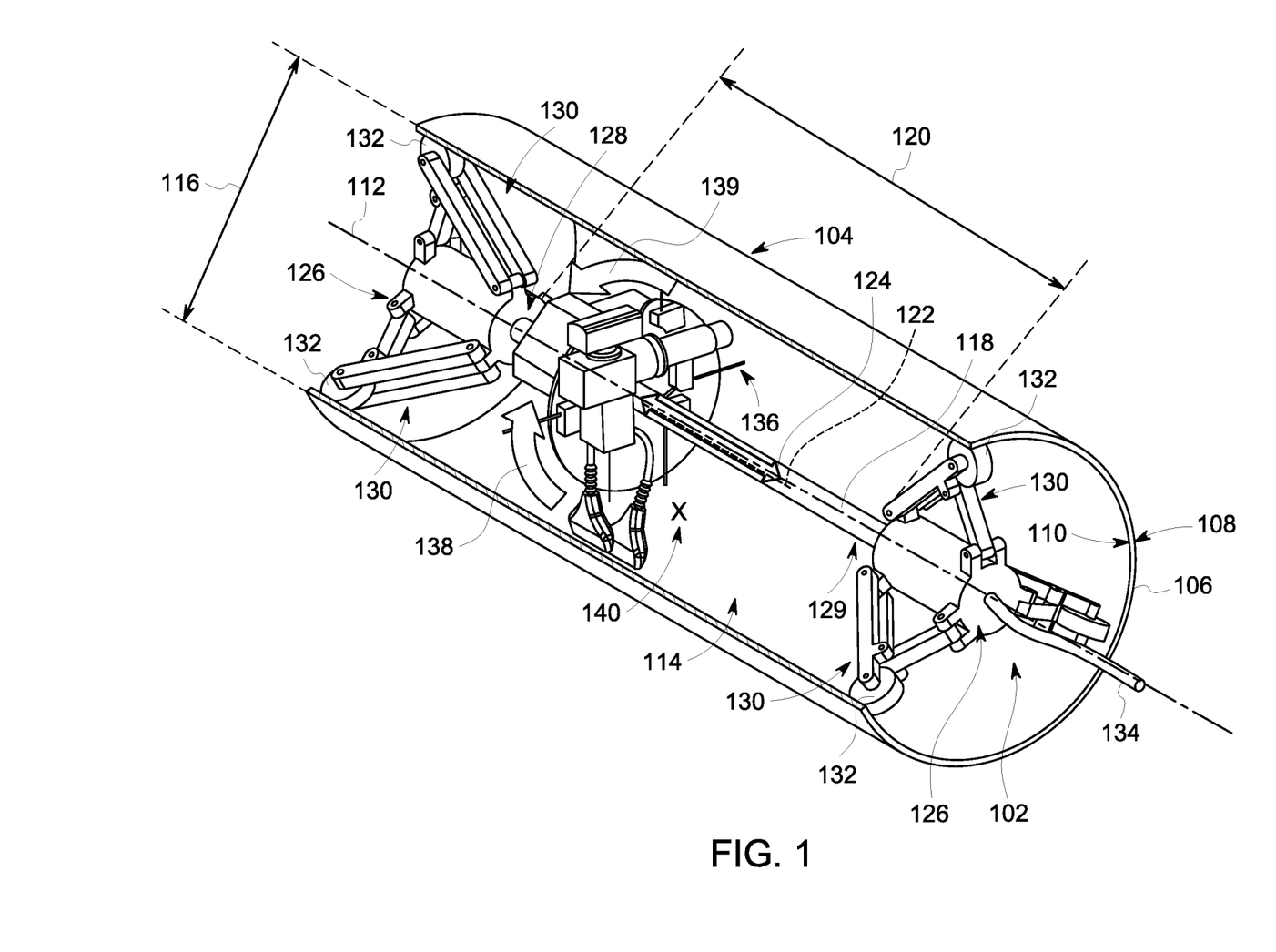
FIG. 1 is a perspective view of a motorized apparatus within a portion of a pipe in an example embodiment.

FIG. 1 is a perspective view of a motorized apparatus 102 within a pipe 104 in an example embodiment. As illustrated in FIG. 1, pipe 104 includes a sidewall 106 having an outer surface 108 and an inner surface 110 that opposes outer surface 108. Inner surface 110 of sidewall 106 extends around a central axis 112 of pipe 104 and defines an interior cavity 114 of pipe 104. Pipe 104 is cylindrical in shape and has an inside diameter 116 in a range of about 6 inches to about 36 inches, or about 12 inches to about 36 inches. In some embodiments, pipe 104 has a length (not shown) of 500 feet or longer. In other embodiments, pipe 104 is any shape and/or size and/or length.

In the example embodiment, motorized apparatus 102 travels through interior cavity 114 of pipe 104 along the length of pipe 104. For example, motorized apparatus 102 is sized to fit within interior cavity 114 and travels 500 feet or more along the length of pipe 104. Accordingly, motorized apparatus 102 facilitates the inspection and/or repair of inner surface 110 of pipe 104 at a work location 140. Further, motorized apparatus 102 is self-propelled, such that motorized apparatus 102 moves within interior cavity 114 without an external force acting on motorized apparatus 102.

In the example embodiment, motorized apparatus 102 includes a main body 118 having a length 120 that extends along a longitudinal axis 122 of main body 118. Main body 118 includes a first end 128 and a second end 129.

Longitudinal axis 122 of main body 118 is substantially parallel to a travel direction 124 of motorized apparatus 102 through pipe 104 and also substantially parallel to central axis 112 of pipe 104. In the example embodiment, motorized apparatus 102 further includes one or more drive assemblies 126, coupled to one or more of first end 128 and second end 129 of main body 118, which facilitates the movement of motorized apparatus 102 through interior cavity 114 of pipe 104. An arrangement of drive assemblies 126 on the forward and aft positions of motorized apparatus 102 in some embodiments enables motorized apparatus 102 to both push and pull itself through terrain such as expansion joints and diameter reducing couplings.

In addition, in the example embodiment, drive assemblies 126 include one or more leg assemblies 130 that include driven members 132 that move motorized apparatus 102 relative to pipe 104 in the travel direction 124. In some embodiments, leg assemblies 130 extend away from and retract towards longitudinal axis 122 of the main body, which facilitates operation of motorized apparatus 102 within pipes having different diameters and/or transitions. Further, the radial movement of leg assemblies 130 facilitates contact between driven members 132 and inner surface 110 of pipe 104 with variable forces, which facilitates movement of motorized apparatus 102 through pipe 104 without relying on a weight of motorized apparatus 102 for traction within pipe 104.

Driven members 132 are depicted as wheels in the example embodiment, but driven members 132 have other shapes or designs in other embodiments. In some embodiments, driven members 132 include tracks or other types of rotatable elements that contact inner surface 110 of pipe 104 and reposition or move motorized apparatus 102 in travel direction 124. In some embodiments, the friction surface of driven members 132 is high temperature silicone, which has an operating temperature of over 550° F. and has desirable high friction and low thermal conductivity, which helps thermally isolate motorized apparatus 102 from inner surface 110 of sidewall 106 of pipe 104.

In the example embodiment, a maintenance head 136 of the motorized apparatus is movably coupled to main body 118. Maintenance head 136 moves along length 120 of main body 118 between first end 128 and second end 129 of main body 118 and further, maintenance head 136 rotates about longitudinal axis 122 of main body 118. For example, maintenance head 136 rotates about longitudinal axis 122 of main body 118 in the directions of first arrow 148 and second arrow 139. In the orientation depicted in FIG. 1, first arrow 138 corresponds to a clockwise rotation of maintenance head 136 about longitudinal axis 122 of main body 118, and second arrow 139 corresponds to a counterclockwise rotation of maintenance head 136 about longitudinal axis 122 of main body 118.

Figure 2:
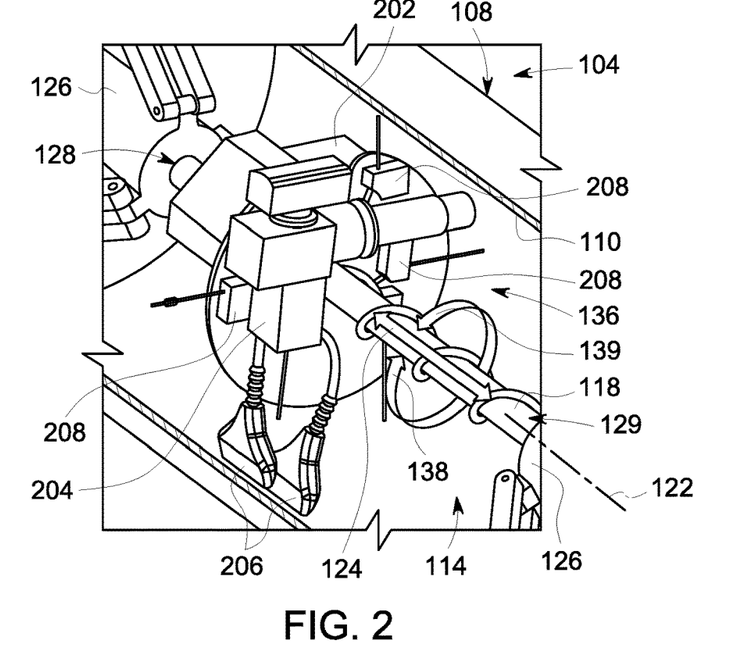
FIGS. 2 and 3 are enlarged perspective views of a maintenance head of the motorized apparatus of FIG. 1 in an example embodiment.
Figure 7:
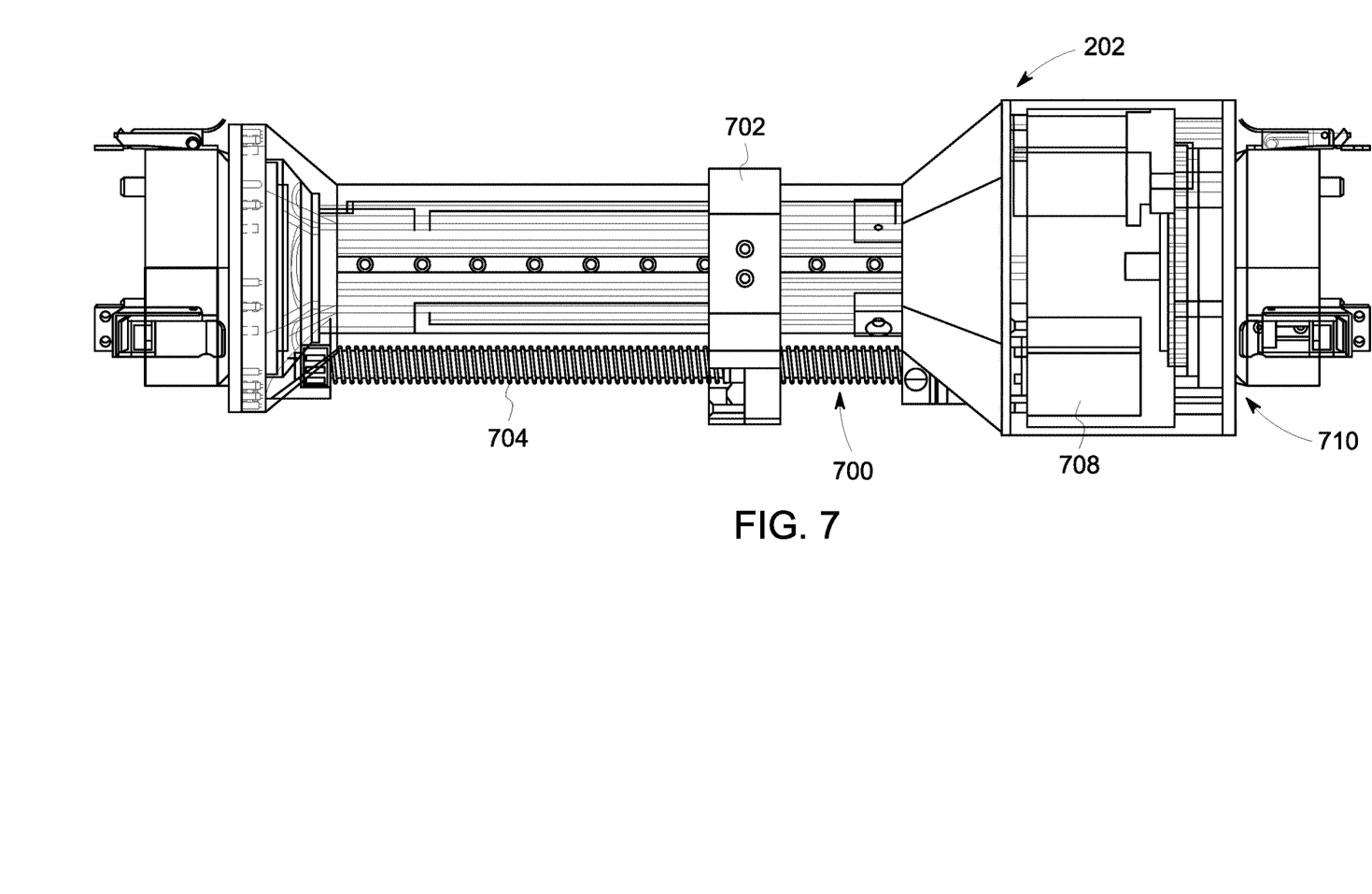
FIG. 7 is a perspective view of an actuator for use with the motorized apparatus shown in FIG. 1 with an external housing of the maintenance device actuator made transparent to illustrate internal components.
Figure 8:
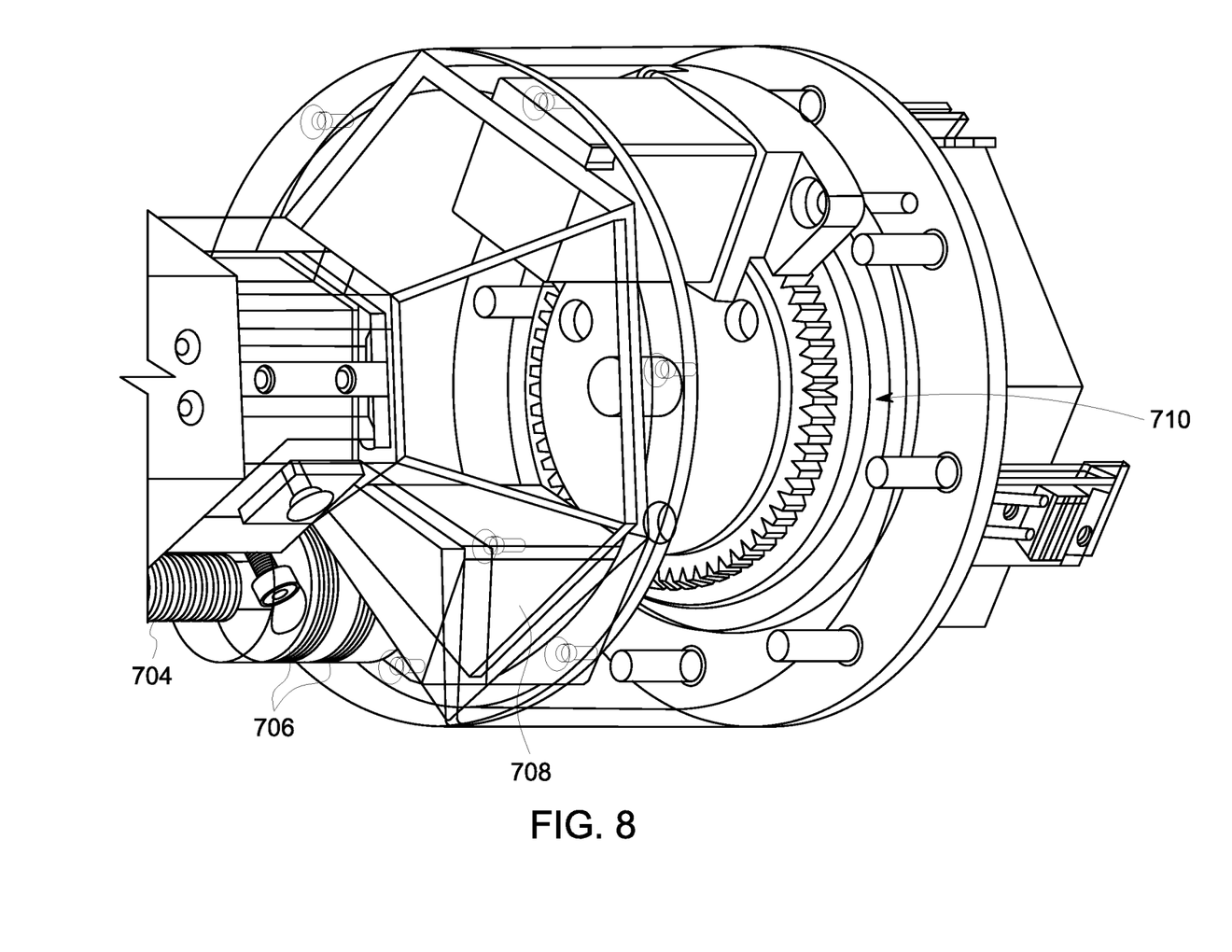
FIG. 8 is an enlarged perspective view of a portion of the actuator shown in FIG. 7.

FIG. 2 is an enlarged perspective view of maintenance head 136 of motorized apparatus 102 in an example embodiment. In the example embodiment, maintenance head 136 includes at least one actuator 202 that facilitates the movement of maintenance head 136 along length 120 of main body 118 and rotation of maintenance head 136 about longitudinal axis 122 of main body 118 (see FIG. 1). For example, in an embodiment shown in FIGS. 7 and 8, actuator 202 includes a screw drive 700 coupled to a carriage 702. Carriage 702 is configured to support maintenance head 136 on main body 118. Screw drive 700 includes a threaded member 704, gears 706, and a stepper motor 708. Stepper motor 708 is operable to cause rotation of gears 706 coupled to threaded member 704. Threaded member 704 rotates when gears 706 are rotated. Carriage 702 is threadedly engaged with threaded member 704 and translates longitudinally along threaded member 704 when threaded member 704 rotates. Stepper motor 708 is configured to position carriage 702 along the length of threaded member 704. Stepper motor 708 includes an encoder that provides information relating to a location of carriage 702. In addition, actuator 202 includes a rotary actuator 710 coupled to an end of a maintenance device portion and is configured to rotate maintenance head 136 and at least a portion of main body 118 about an axis. In alternative embodiments, maintenance head 136 includes any actuator 202 that enables maintenance head 136 to operate as described herein.

In the example embodiment depicted in FIG. 2, maintenance head 136 includes one or more depth sensors 208 that generate information about inner surface 110 of pipe 104 proximate to work location 140. Depth sensors 208 generate distance information between maintenance head 136 and inner surface 110 of pipe 104. For example, depth sensors 208 generate point cloud data of inner surface 110 of pipe 104 in some embodiments, which is used to generate a three-dimensional (3D) model of a portion of interior cavity 114 that is proximate to work location 140. The 3D model may be used for various processes, which will be discussed later.

In the example embodiment, maintenance head 136 includes a laser cladding head 204 and one or more nozzles 206. Laser cladding head 204 performs a cladding buildup action on inner surface 110 of pipe 104, and nozzles 206 perform an action to provide a forming gas for controlling the atmosphere proximate to motorized apparatus 102 (e.g., during a welding process), and/or to provide suction proximate to motorized apparatus 102 (e.g., to remove debris). In some embodiments, nozzles 206 remove debris before, during, and/or after an action is performed on inner surface 110 of pipe 104 (e.g., an action such as welding, cladding, cleaning, etc.). Moreover, in some embodiments, nozzles 206 direct debris through interior cavity 114 as motorized apparatus 102 travels through pipe 104. In some embodiments, nozzles 206 are under vacuum (e.g., tether 134 is coupled to a vacuum source) in order to remove debris proximate to nozzles 206.

Figure 3:
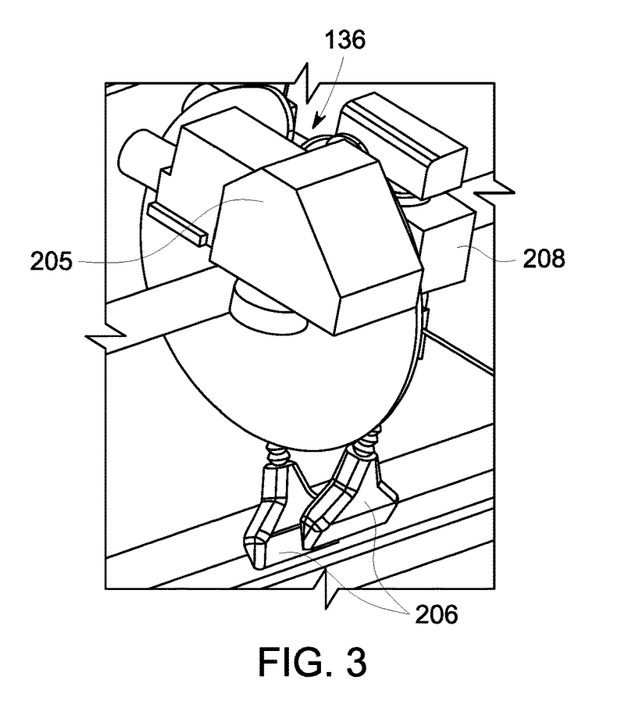

FIG. 3 depicts a different perspective view of maintenance head 136 in the example embodiment. In this view, an ablation laser 205 of the maintenance head 136 is visible. Ablation laser 205 performs an action to clean inner surface 110 of pipe 104.

In some embodiments, maintenance head 136 includes any device that enables maintenance head 136 to operate as described herein. For example, in some embodiments, maintenance head 136 includes, without limitation, any of the following, considered alone or in combination: an applicator, a drill, a grinder, a heater, a welding electrode, a sprayer, an optical sensor (e.g., visible, infrared, and/or multi-spectral sensor), a mechanical sensor (e.g., stylus profilometer, coordinate measurement probe, load transducer, linear variable differential transformer), a thermal sensor (e.g., pyrometer, thermocouple, resistance temperature detector), a magnetic sensor, an acoustic sensor (e.g., piezoelectric, microphone, ultrasound), and an electromagnetic sensor (e.g., eddy current, potential drop, x-ray). In some embodiments, maintenance head 136 is used to provide information for steering motorized apparatus 102 and/or information used to perform an action at work location 140 within pipe 104.

In some embodiments, motorized apparatus 102 includes a light source (not shown) that illuminates at least a portion of interior cavity 114 to facilitate steering of motorized apparatus 102 and/or to facilitate the capture of images of inner surface 110 of pipe 104 by maintenance head 136. The light source is coupled to main body 118 and/or to maintenance head 136 in some embodiments.

Figure 4:
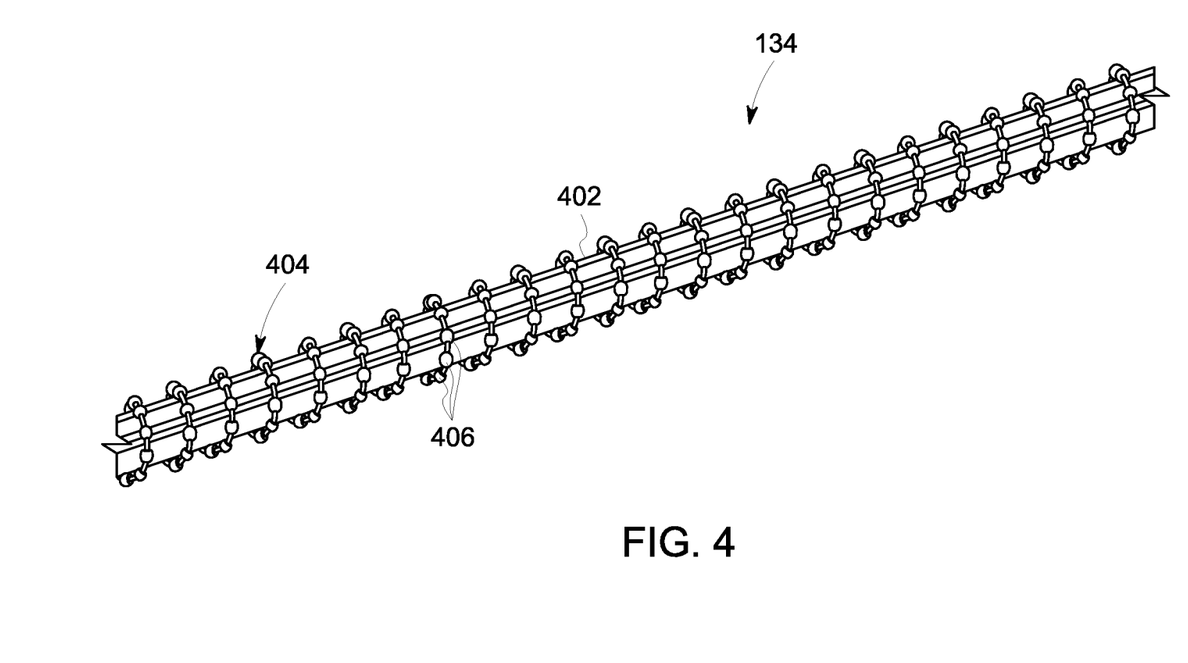
FIG. 4 is a perspective view of a tether for the motorized apparatus of FIG. 1 in an example embodiment.

FIG. 4 is a perspective view of tether 134 in an example embodiment. In this embodiment, tether 134 includes a casing 402, which surrounds and protects one or more internal conduits, channels, wires, optical cables, etc., (not shown) that are used to provide materials and/or electrical power and/or communication capabilities to motorized apparatus 102 from an external entity (e.g., a base station external to pipe 104, not shown).

In some embodiments, casing 402 of tether 134 is wrapped by a coil 404, which includes projections 406. Coil 404 and projections 406 attached to coil 404 separate the casing 402 from inner surface 110 of pipe 104. Projections 406 are shaped to provide minimal contact with inner surface 110 of pipe 104. In some embodiments, projections 406 are spherical. In addition, projections 406 include a material providing less friction and less thermal conductivity than coil 404 and/or casing 402. In some embodiments, projections 406 include a low friction and/or insulative coating. As a result, projections 406 reduce an amount of friction between casing 402 and inner surface 110 of pipe 104 and, therefore, reduce the amount of force used to pull tether 134 as motorized apparatus 102 moves through pipe 104. In addition, projections 406 reduce heat transfer from pipe 104 to casing 402. In some embodiments, projections 406 include ceramic beads.

Figure 5:
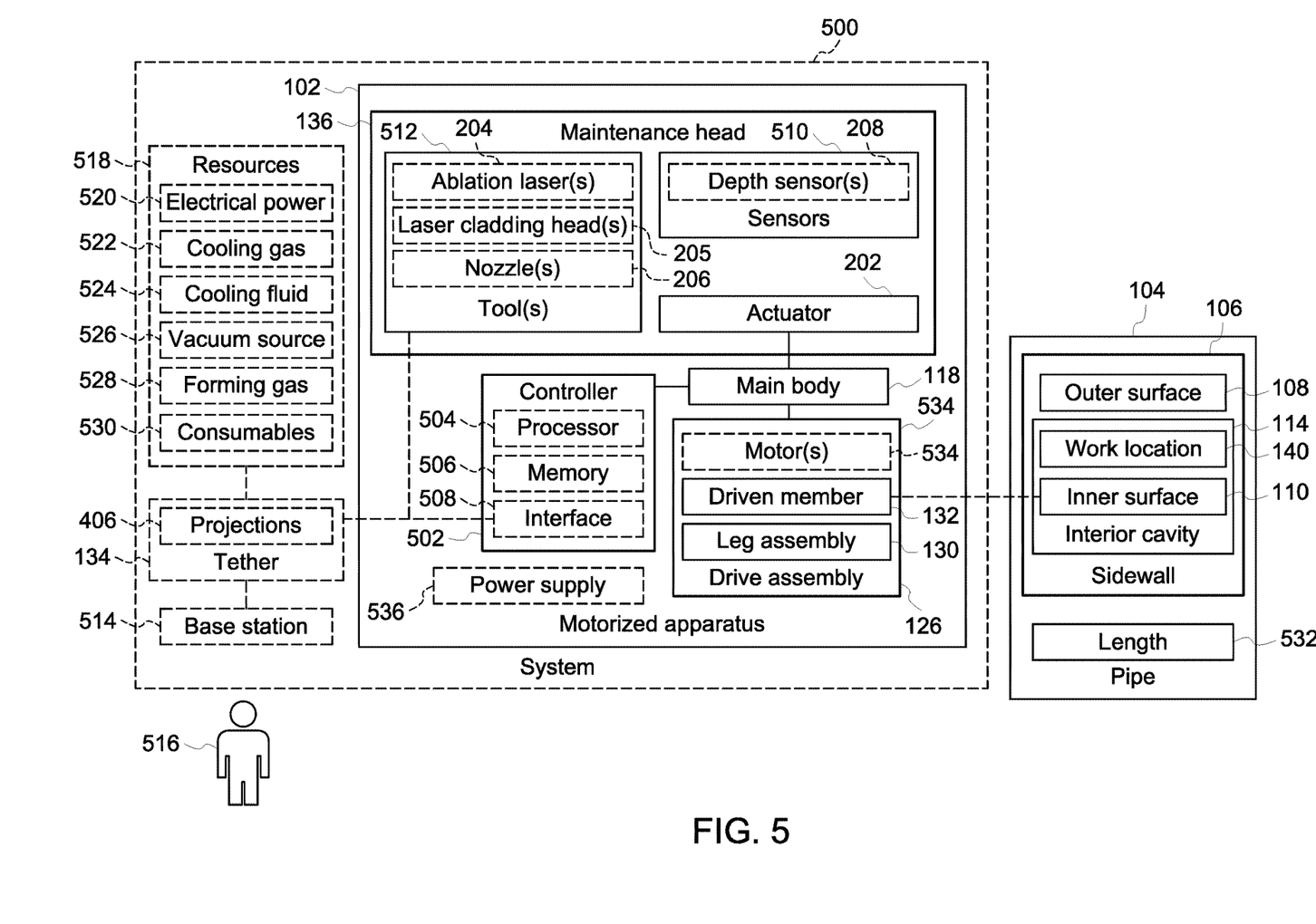
FIG. 5 is a block diagram of a system for use in maintaining pipes in an example embodiment.

FIG. 5 is a block diagram of a system 500 for use in maintaining pipes in an example embodiment. In the example embodiment of system 500, motorized apparatus 102 includes a controller 502. Controller 502 includes any component, system, or device that controls the operation of motorized apparatus 102 as described herein. In some embodiments, controller 502 includes a processor 504, a memory 506, and an interface 508, in any combination. Processor 504 includes any electronic circuits and/or optical circuits that are able to perform functions described herein for controller 502.

Memory 506 includes any electronic circuits and/or optical circuits and/or magnetic circuits that are able to store data. For instance, memory 506 may store information regarding one or more sensors 510 (including but not limited to any sensor described herein, such as depth sensors 208) on maintenance head 136, which may then be used by processor 504 to reposition maintenance head 136 to orient one or more tools 512 (including but not limited to any tool described herein, such as laser cladding head 204, ablation laser 205, and nozzles 206) during a maintenance process on pipe 104.

Interface 508 of controller 502 includes any component, system, or device that enables communication between motorized apparatus 102 and another entity. Such communications include wired communications (e.g., Ethernet) and wireless communications (e.g., Wi-Fi, Cellular, etc.) in various embodiments.

In some embodiments, interface 508 is communicatively coupled to a base station 514 via a wired communication channel (not shown) provided by tether 134. In other embodiments, interface 508 is communicatively coupled to base station 514 via a wireless communication channel (not shown).

Base station 514 includes any component, system, or device that facilitates interaction between a remote operator 516 and motorized apparatus 102. For example, base station 514 may include a user interface (not shown) that facilitates, by remote operator 516, the analysis of data from sensors 510, the operation of tools 512 on maintenance head 136, the operation of drive assemblies 126 of motorized apparatus 102, repositioning of maintenance head 136, etc. The user interface may include, displays, joysticks, mice, trackballs, keyboards, etc.

In some embodiments, system 500 provides various resources 518 to motorized apparatus 102 via tether 134. Resources 518 provided to motorized apparatus 102 include, without limitation, one or more of electrical power 520, a cooling gas 522 (e.g., nitrogen, an inert gas such as argon, etc.), a cooling fluid 524, a vacuum source 526, a forming gas 528, and consumables 530. In some embodiments, cooling gas 522 and/or cooling fluid 524 is used to provide cooling to various components of motorized apparatus 102 (e.g., controller 502, drive assemblies 126, sensors 510, tools 512, etc.). In other embodiments, forming gas 528 (e.g., nitrogen with a mix of 2-10% hydrogen) is ejected by nozzles 206 to control the atmosphere around motorized apparatus 102 (e.g., at work location 140). Further, consumables 530 provided by tether 134 to motorized apparatus 102 include, any type of material used by tools 512, including but not limited to welding wire, flux, paint, epoxy, or other types of spray coatings. Vacuum source 526 in some embodiments is coupled to one or more of nozzles 206 in order to remove debris in the area around motorized apparatus 102 (e.g., at work location 140).

In some embodiments, drive assemblies 126 of motorized apparatus 102 include one or more motors 534 that generate torque for driven members 132 to move motorized apparatus 102 in travel direction 124. In one embodiment, motorized apparatus 102 includes a power source 536 that provides power for the operation of motors 534 to generate torque for driven members 132. In some embodiments, the power source 536 is electrical power, and the electrical power is provided by batteries (not shown) at motorized apparatus 102 and/or via tether 134 attached to motorized apparatus 102.

Figure 6:
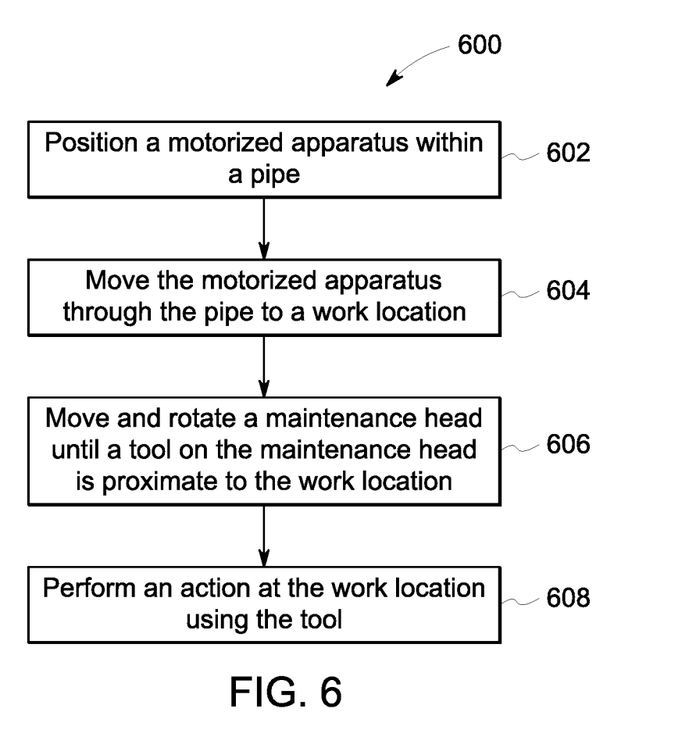
FIG. 6 is a flow chart of a method of maintaining a pipe in an example embodiment.

FIG. 6 is a flow chart of a method 600 of maintaining pipes in an example embodiment. Method 600 will be discussed with respect to motorized apparatus 102 depicted in FIGS. 1-5 and system 500 depicted in FIG. 5, although method 600 may be performed by other motorized apparatus and systems not explicitly shown or described herein. The steps of method 600 are not all inclusive and may include other steps beyond those explicitly described herein. Further, the steps of method 600 may be performed in a different order.

To begin an inspection and/or repair process on inner surface 110 of pipe 104, motorized apparatus 102 is placed into interior cavity 114 of pipe 104 from an opening in pipe 104 and/or through an access hatch in pipe 104 (see step 602 of FIG. 6). Motorized apparatus 102 travels in travel direction 124 (see FIG. 1) through the interior cavity 114 of pipe 104, which extends in either direction along a length 532 (see FIG. 5) of pipe 104. For example, controller 502 directs drive assemblies 126 to rotate driven members 132 (e.g., via motors 534), which contact inner surface 110 of sidewall 106 of pipe 104 and propel motorized apparatus 102 in travel direction 124. In some embodiments, motorized apparatus 102 operates autonomously or semi-autonomously under direction of controller 502 to move in travel direction 124. In other embodiments, remote operator 516 (see FIG. 5) utilizes base station 514 to interact with controller 502 and/or motorized apparatus 102 directly to move motorized apparatus 102 in travel direction 124.

In some embodiments, motorized apparatus 102 traverses transitions in pipe 104 such as bends in pipe 104 or transitions in the size of pipe 104 by modifying the radial position of leg assemblies 130 relative to longitudinal axis 122 of main body 118. Motorized apparatus 102 continues in travel direction 124 until motorized apparatus 102 reaches work location 140 on inner surface 110 of pipe 104 (see step 604 of FIG. 6). In particular, motorized apparatus 102 moves through pipe 104 until work location 140 is between first end 128 and second end 129 of main body 118, based on a range of motion of the maintenance head 136 along length 120 of main body 118. For example, controller 502 directs drive assemblies 126 to rotate driven members 132 and move motorized apparatus 102 in travel direction 124 until work location 140 is located between first end 128 and second end 129 of main body 118. When motorized apparatus 102 reaches a target location, motorized apparatus 102 goes into a parked mode. For example, the rotation of driven members 132 is stopped at the target location and, in some embodiments, motorized apparatus 102 parks by positioning leg assemblies 130 such that an increased force is provided on inner surface 110 from leg assemblies 130.

In some embodiments, motorized apparatus 102 operates autonomously or semi-autonomously under direction of controller 502 to move in travel direction 124 and stop at work location 140. In other embodiments, remote operator 516 (see FIG. 5) utilizes base station 514 to interact with controller 502 and/or motorized apparatus 102 directly to move motorized apparatus 102 in travel direction 124 and stop at work location 140.

In some embodiments, motorized apparatus 102 detects characteristics of pipe 104 around motorized apparatus 102 when motorized apparatus 102 is parked within interior cavity 114. For example, in some embodiments, a map is generated of inner surface 110 around motorized apparatus 102 when motorized apparatus 102 is parked at a location along pipe 104. After the map is generated, motorized apparatus 102 is able to perform a maintenance operation on inner surface 110 based on information from the map. Accordingly, motorized apparatus 102 is able to operate even if sensors are unable to provide information during a maintenance operation.

Because maintenance head 136 is free to move along length 120 of main body 118 and rotate about longitudinal axis 122 of main body 118, the placement of motorized apparatus 102 relative to work location 140 within pipe 104 may be inexact and controller 502 causes maintenance head 136 to move and/or rotate to a precise location for performing the action, thereby providing a technical benefit of improving the efficiency and speed at which work is performed on pipe 104.

When motorized apparatus 102 is at work location 140 and/or prior to motorized apparatus 102 reaching work location 140, maintenance head 136 is repositioned with respect to main body 118 (e.g., controller 502 operates actuator 202 to reposition maintenance head 136) to bring tools 512 of maintenance head 136 proximate to work location 140. In particular, maintenance head 136 moves along length 120 of main body 118 and rotates about longitudinal axis 122 of main body 118 until tools 512 are proximate to work location 140 (see step 606 of FIG. 6). In some embodiments, motorized apparatus 102 operates autonomously or semi-autonomously under direction of controller 502 to re-position maintenance head 136 with respect to main body 118. In other embodiments, remote operator 516 (see FIG. 5) utilizes base station 514 to interact with controller 502 and/or motorized apparatus 102 directly to reposition maintenance head 136 with respect to main body 118. Controller 502 and/or remote operator 516 may utilize one or more tool frame cameras (not shown), prior images of work location 140 and/or new images of work location 140 to accurately position maintenance head 136 during the repair process.

In some embodiments, controller 502 determines a position of maintenance head 136 relative to a target on inner surface 110 when motorized apparatus 102 is parked at work location 140. For example, controller 502 determines positions of motorized apparatus 102 and/or maintenance head 136 based on information acquired from one or more sensors. Controller 502 compares the determined positions to a map of inner surface 110 and determines a desired position of maintenance head 136 based on one or more operating parameters of the maintenance operation. Controller 502 determines a difference between the determined position of maintenance head 136 and the desired position of maintenance head 136 required for the maintenance operation. Controller 502 determines instructions for one or more actuators 202 to position maintenance head 136 in the desired position. For example, the instructions may cause actuator 202 to move maintenance head 136 along length 120 of main body 118 and/or rotate maintenance head 136 about longitudinal axis 122. In some embodiments, maintenance head 136 is able to move maintenance head 136 along length 120 of main body 118 and rotate maintenance head 136 about longitudinal axis 122 simultaneously or sequentially. Controller 502 determines the amount of rotation and translation required to reach a desired position. Suitably, maintenance head 136 is able to move in at least three directions which facilitate maintenance head 136 reaching a desired position quicker and maintenance head 136 having a larger area of regard. In some embodiments, controller 502 checks the position of maintenance head 136 after maintenance head 136 translates and/or rotates and controller 502 makes adjustments to precisely position maintenance head 136 for the maintenance operation.

In response to repositioning maintenance head 136, controller 502 directs tools 512 to perform an action at work location 140 (see step 608 of FIG. 6). For example, motorized apparatus 102 may perform a welding operation, a cladding operation, a cleaning operation, a spray deposition process, or any other type of process at work location 140. In some embodiments, motorized apparatus 102 operates autonomously or semi-autonomously under direction of controller 502 to perform the action at work location 140. In other embodiments, remote operator 516 (see FIG. 5) utilizes base station 514 to interact with controller 502 and/or motorized apparatus 102 directly to perform the action at work location 140.

In one example embodiment, tether 134 is coupled to motorized apparatus 102. Using tether 134, motorized apparatus 102 is supplied with one or more of resources 518 previously described, which are used by motorized apparatus 102 to perform the action(s) at work location 140. The use of tether 134 provides motorized apparatus 102 with additional resources and consumables that enable tools 512 to perform a wider variety of processes at the work location, thereby providing a technical benefit of improving the efficiency and capability of work performed at work location 140. In addition, projections 406 on tether 134 provide a low friction surface that, when in contact with inner surface 110 of pipe 104, facilitates motorized apparatus 102 in pulling tether 134 farther along length 532 of the pipe, thereby facilitating the use of motorized apparatus 102 at a farther distance within pipe 104 from loading point or entry point of motorized apparatus 102 into pipe 104. Projections 406 also provide high thermal isolation between tether 134 and inner surface 110 of pipe 104, which prevents damage to the internal components of tether 134. Thus, tether 134 and projections 406 on tether 134 provide a technical benefit of a low friction and high thermally isolating surface, which improves the performance of tether 134 and motorized apparatus 102.

In another embodiment, depth sensors 208 are used to generate surface data of inner surface 110 of pipe 104 at work location 140. In this embodiment, maintenance head 136 is moved along length 120 of main body 118 and rotated about longitudinal axis 122 of main body 118 to generate surface data of inner surface 110 of pipe 104 at work location 140 using depth sensors 208. For example, by rotating maintenance head 136 around longitudinal axis 122 of main body 118 and traversing maintenance head 136 along length 120 of main body 118, depth sensors 208 collect a complete point cloud model of inner surface 110 of pipe 104 in coordinates that are fixed to motorized apparatus 102, which is stationary relative to pipe 104. This fixed coordinate system, tied through motorized apparatus 102 to pipe 104, provides motorized apparatus 102 information to know its surroundings blindly, making motorized apparatus 102 robust to challenges such as fogged over lenses and poor visibility. In some embodiments, motorized apparatus 102 operates autonomously or semi-autonomously under direction of controller 502 to generate the surface data at work location 140. In other embodiments, remote operator 516 (see FIG. 5) utilizes base station 514 to interact with controller 502 and/or motorized apparatus 102 directly to generate the surface data at work location 140.

In this embodiment, a 3D model of pipe 104 is generated of a portion of interior cavity 114 of pipe 104 at work location 140 based on the surface data. In one embodiment, controller 502 generates the 3D model. In other embodiments, the sensor data is provided to a remote entity, which calculates and provides the 3D model to controller 502. The 3D model may be used in a number of different ways to aid in the repair of pipe 104. For example, the 3D model may be used to identify T-junctions in pipe 104 when the T-junctions generate sharp signal transitions and/or a loss of signal in the point cloud data used to generate the 3D model, which may then be used to more accurately identify the location of the T-junctions in pipe 104. It may be desirable to identify the T-junctions in order to perform a cleaning process and/or a repair process at the interface of the T-junctions with pipe 104 (e.g., around a perimeter of the T-junction at pipe 104 along inner surface 110 of pipe 104).

Using the 3D model, a tool path is calculated based on the 3D model. In one embodiment, controller 502 calculates the tool path. In other embodiments, the 3D model is provided to a remote entity, which calculates and provides the tool path to controller 502. Maintenance head 136 is moved and rotated based on the tool path to position the tools 512 proximate to the work location 140. For example, the tool path may define how maintenance head 136 is moved and rotated to correctly position the laser output of ablation laser 205 at work location 140, in order to perform an ablation process at work location 140.

In another embodiment, a buildup profile is used to perform a buildup process on the inner surface 110 of the pipe 104. A buildup profile defines the extent and height of cladding material applied to the inner surface of the pipe at work location 140. In this embodiment, the surface data is calculated and the 3D model of work location 140 within pipe 104 is generated, as previously described. A buildup profile is calculated based on the 3D model. In one embodiment, controller 502 generates the buildup profile. In other embodiments, the 3D model is provided to a remote entity, which calculates and provides the buildup profile to controller 502. A buildup process is performed at work location 140 based on the buildup profile. For example, laser cladding head 204 positioned proximate to work location 140 and is used to deposit cladding material on inner surface 110 of pipe 104 at work location 140.

Embodiments described herein provide motorized apparatus 102 and systems 500 for maintaining and inspecting a variety of piping applications. Motorized apparatus 102 is able to move with protected sensing and maintenance equipment through interior cavity 114 of pipes 104 with wall temperatures of 350° F. and an ambient atmosphere that is 250° F. with 100% relative humidity. Motorized apparatus 102 adapts to variable pipe diameters using leg assemblies 130. Leg assemblies 130 keep motorized apparatus 102 centered radially in pipe 104. Because maintenance head 136 rotates about longitudinal axis 122 of main body 118, there is no preferred roll orientation for motorized apparatus 102 and therefore, complicated steering mechanisms on motorized apparatus 102 to re-orient motorized apparatus 102 as motorized apparatus 102 traverses pipe 104 are not needed.

The technical benefits of the methods, systems, and motorized apparatus described herein includes: (a) reducing the time to inspect and/or repair pipes; (b) enabling inspection and repair of the interior cavities of the pipes at greater distances from access openings; (c) increasing the information that is available during a maintenance operation of the interior cavities of the pipes; (d) facilitating the operation of motorized apparatus in harsh environments that may exist within a pipe; and (e) facilitating the ability of motorized apparatus to fit within a range of pipe sizes and traverse different transitions.

Example embodiments of systems and methods for use in maintaining pipes are described above in detail. The methods and systems are not limited to the specific embodiments described herein, but rather, components of systems and/or steps of the methods may be utilized independently and separately from other components and/or steps described herein. For example, the method may also be used in combination with other components and are not limited to practice only with the pipes as described herein. Rather, the example embodiment can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in maintaining a pipe having a sidewall defining an interior cavity and having an inner surface, said system comprising:
   a motorized apparatus sized to fit within the interior cavity of the pipe, said motorized apparatus comprising:
      a main body having a length extending along a longitudinal axis of said main body, said main body comprising a first end and a second end opposite said first end;
      at least one drive assembly coupled to at least one of said first end and said second end of said main body, said at least one drive assembly including driven members configured to engage with the inner surface of the pipe and move said motorized apparatus through the interior cavity of the pipe;
      a maintenance head comprising at least one tool configured to perform an action on the inner surface of the pipe;
      a carriage movably coupling said maintenance head to said main body; and
      at least one actuator configured to move said maintenance head along an entirety of the length of said main body between said first end and said second end and rotate said maintenance head about the longitudinal axis of said main body; and at least one controller communicatively coupled to said motorized apparatus and configured to:
- move said motorized apparatus through the pipe utilizing said at least one drive assembly until a work location on the inner surface of the pipe is positioned between said first end and said second end of said main body;
- move said maintenance head along the length of said main body and rotate said maintenance head about the longitudinal axis of said main body until said at least one tool is proximate to the work location; and
- perform the action at the work location using said at least one tool.

2. The system of claim 1, wherein:
said maintenance head comprises at least one depth sensor, and
said controller is further configured to:
- move and rotate said maintenance head to generate surface data of the inner surface of the pipe using said at least one depth sensor;
- generate a three-dimensional model of a portion of the interior cavity of the pipe at the work location based on the surface data;
- calculate a tool path for said at least one tool based on the three-dimensional model; and
- move and rotate said maintenance head based on the tool path until said at least one tool is proximate to the work location.

3. The system of claim 2, wherein:
said maintenance head comprises at least one depth sensor, and
said controller is further configured to:
- move and rotate said maintenance head to generate surface data of the inner surface of the pipe using said at least one depth sensor;
- generate a three-dimensional model of a portion of the interior cavity of the pipe at the work location based on the surface data;
- calculate a buildup profile for a material deposition process at the work location based on the three-dimensional model; and
- perform a buildup process at the work location based on the buildup profile.

4. The system of claim 1, further comprising:
at least one tether coupled to said motorized apparatus and configured to provide one or more resources to said motorized apparatus,
wherein said controller is further configured to perform the action at the work location using the one or more resources provided by said at least one tether, and
wherein said at least one tether comprises a plurality of projections that thermally and frictionally isolate said at least one tether from the inner surface of the pipe.

5. The system of claim 4, wherein:
said at least one tether is further configured to provide one or more resources including one or more of electrical power, a cooling gas, a cooling fluid, a vacuum source, a forming gas, and/or consumables used by said at least one tool.

6. The system of claim 1, wherein:
said at least one tool comprises one or more of an ablation laser, a laser cladding head, and/or a nozzle.

7. A method for maintaining a pipe having a sidewall defining an interior cavity and having an inner surface, said method comprising:

positioning a motorized apparatus within the interior cavity of the pipe, wherein the motorized apparatus includes a main body having a length extending along a longitudinal axis of the main body, the main body comprising a first end and a second end opposite the first end, the motorized apparatus further including at least one drive assembly coupled to at least one of the first end and the second end of the main body, the at least one drive assembly comprising driven members configured to engage with the inner surface of the pipe;

moving the motorized apparatus through the interior cavity of the pipe using the at least one drive assembly until a work location on the inner surface of the pipe is positioned between the first end and the second end of the main body;

moving a maintenance head coupled to the main body along the length of the main body and rotating the maintenance head about the longitudinal axis of the main body until at least one tool on the maintenance head is proximate to the work location, wherein the motorized apparatus includes a carriage movably coupling the maintenance head to the main body and at least one actuator configured to move said maintenance head along an entirety of the length of the main body between the first end and said second end and rotate the maintenance head about the longitudinal axis of the main body; and performing an action at the work location using the at least one tool.

8. The method of claim 7, further comprising:
moving and rotating the maintenance head to generate surface data of the inner surface of the pipe using at least one depth sensor on the maintenance head;
generating a three-dimensional model of a portion of the interior cavity of the pipe at the work location based on the surface data; and
calculating a tool path for the at least one tool based on the three-dimensional model,
wherein said moving and said rotating the maintenance head until at least one tool on the maintenance head is proximate to the work location further comprises:
moving and rotating the maintenance head based on the tool path.

9. The method of claim 7, further comprising:
moving and rotating the maintenance head to generate surface data of the inner surface of the pipe using at least one depth sensor on the maintenance head;
generating a three-dimensional model of a portion of the interior cavity of the pipe at the work location based on the surface data; and
calculating a buildup profile for a material deposition process at the work location based on the three-dimensional model,
wherein said performing the action further comprises:
performing a buildup process at the work location based on the buildup profile.

10. The method of claim 7, further comprising:
coupling at least one tether to the motorized apparatus that thermally and frictionally isolates the at least one tether from the inner surface of the pipe; and
providing one or more resources to the motorized apparatus using the at least one tether,
wherein said performing the action at the work location further comprises:
performing the action at the work location using the one or more resources provided by the at least one tether.

11. The method of claim 10, wherein said providing the one or more resources further comprises:
provideing one or more of electrical power, a cooling gas, a cooling fluid, a vacuum source, a forming gas, and/or consumables used by the at least one tool.

12. The method of claim 7, wherein said performing the action further comprises performing at least one of:
an ablation process, a laser cladding process, a welding process, and/or a gas forming process.

13. A motorized apparatus for maintaining a pipe having a sidewall defining an interior cavity and an inner surface, said motorized apparatus comprising:
a main body having a length extending along a longitudinal axis of said main body, said main body comprising a first end and a second end opposite said first end;
at least one drive assembly coupled to at least one of said first end and said second end of said main body, said at least one drive assembly comprising driven members configured to engage with the inner surface of the pipe and move said motorized apparatus through the interior cavity of the pipe;
a maintenance head comprising at least one tool configured to perform an action on the inner surface of the pipe;
a carriage movably coupling said maintenance head to said main body; and
at least one actuator configured to move said maintenance head along an entirety of the length of said main body between said first end and said second end and rotate said maintenance head about the longitudinal axis of said main body.

14. The motorized apparatus of claim 13, further comprising at least one controller configured to:
move said motorized apparatus through the pipe utilizing said at least one drive assembly until a work location on the inner surface of the pipe is positioned between said first end and said second end of said main body;
move and rotate said maintenance head until said at least one tool is proximate to the work location; and
perform the action at the work location using said at least one tool.

15. The motorized apparatus of claim 14, wherein:
said maintenance head includes at least one depth sensor, and
said controller is further configured to:
move and rotate said maintenance head to generate surface data of the inner surface of the pipe using said at least one depth sensor;
generate a three-dimensional model of a portion of the interior cavity of the pipe at the work location based on the surface data;
calculate a tool path for said at least one tool based on the three-dimensional model; and
move and rotate said maintenance head based on the tool path until said at least one tool is proximate to the work location.

16. The motorized apparatus of claim 14, wherein:
said maintenance head comprises at least one depth sensor, and
said controller is further configured to:
move and rotate said maintenance head to generate surface data of the inner surface of the pipe using said at least one depth sensor;
generate a three-dimensional model of a portion of the interior cavity of the pipe at the work location based on the surface data;
calculate a buildup profile for a material deposition process at the work location based on the three-dimensional model; and
perform a buildup process at the work location based on the buildup profile.

17. The motorized apparatus of claim 14, further comprising:
at least one tether coupled to said motorized apparatus and configured to provide one or more resources to said motorized apparatus, wherein said at least one tether comprises a plurality of projections that thermally and frictionally isolate said at least one tether from the inner surface of the pipe, and wherein said at least one tool is further configured to perform the action on the inner surface of the pipe at the work location using the one or more resources provided by said at least one tether.

18. The motorized apparatus of claim 17, wherein:
the one or more resources include one or more of electrical power, a cooling gas, a cooling fluid, a vacuum source, a forming gas, and/or consumables used by said at least one tool.

19. The motorized apparatus of claim 13, wherein:
said at least one tool comprises one or more of an ablation laser, a laser cladding head, and/or a nozzle.

20. The motorized apparatus of claim 13, wherein:
said driven members comprise one or more of wheels and tracks that rotatably contact the inner surface of the pipe.

* * * * *